Aug. 14, 1951  A. D. BLUMLEIN  2,564,390
ELECTRICAL BRIDGE ARRANGEMENT
Filed June 22, 1946  2 Sheets-Sheet 1

INVENTOR
Alan Dower Blumlein, Deceased
By: Doreen Walker, Executrix

BY H.S. Grover
ATTORNEY

Aug. 14, 1951    A. D. BLUMLEIN    2,564,390
ELECTRICAL BRIDGE ARRANGEMENT
Filed June 22, 1946    2 Sheets-Sheet 2

INVENTOR:
Alan Dower Blumlein, Deceased.
By: Doreen Walker, Executrix.

BY H.S. Grover
ATTORNEY

Patented Aug. 14, 1951

2,564,390

UNITED STATES PATENT OFFICE 2,564,390

ELECTRICAL BRIDGE ARRANGEMENT

Alan Dower Blumlein, deceased, late of Ealing, London, England, by Doreen Walker, executrix, Lanherne, Lescudjack, Penzance, Cornwall, England, assignor to Electric & Musical Industries Limited, Hayes, England, a company of Great Britain Application June 22, 1946, Serial No. 678,711
In Great Britain January 10, 1940

Section 1, Public Law 690, August 8, 1946
Patent expires January 10, 1960

10 Claims. (Cl. 175—183)

The present invention relates to electrical bridge arrangements.

Methods are already known for the measurement of impedances by means of bridge arrangements, the impedance being determined by adjusting one or more of the components of such arrangements to give a balance condition, the value of the unknown capacity then being calculable in terms of the values of the known adjustable components.

Although many such methods are satisfactory for the measurement of relatively large impedances difficulties arise in their use for the measurement of very small impedances, particularly in the presence of stray impedances such as stray capacities and the like which may in such cases be comparable to the impedance to be measured, since such stray impedances may render the bridge arrangement seriously inaccurate.

It has already been proposed to reduce such errors by means of a bridge arrangement comprising a pair of equal tightly coupled inductive ratio arms. Such an arrangement has the advantage that at or near the condition of balance the outer ends of the inductive ratio arms are at substantially zero A. C. potential, so that the presence of impedances from these points to earth has little effect upon the accuracy of the bridge arrangement.

It is an object of the present invention to provide a more sensitive and accurate bridge of the aforementioned type having tightly coupled inductive ratio arms.

According to one feature of the present invention there is provided a bridge arrangement for measuring an unknown impedance in terms of a known adjustable impedance comprising two tightly coupled inductances, means for feeding alternating voltage to said unknown impedance and one of said inductances in series, means for feeding alternating voltage of the same frequency as, but of different amplitude from said first mentioned alternating voltage to said known adjustable impedance and the other of said inductances in series, said inductances being so coupled that the magnetic fluxes set up by the currents therein oppose, the arrangement being such that when said adjustable impedance is adjusted so as to cause said fluxes to cancel each other, or to cause the voltage across part or the whole of one or both of said inductances to have a minimum value, said unknown impedance is a calculable fraction or multiple of the impedance to which said adjustable impedance is adjusted, said fraction or multiple being determined by the ratio of the amplitudes of said alternating voltages and the turns ratio of said inductances.

According to another feature of the invention, there is provided a bridge arrangement for measuring an unknown impedance in terms of a known adjustable impedance comprising two tightly coupled inductances, means for feeding alternating voltage to said unknown impedance and one of said inductances in series, means for feeding alternating voltage of the same frequency as said first mentioned alternating voltage to said known adjustable impedance and the other of said inductances in series, said inductances being so coupled that the magnetic fluxes set up by the currents therein oppose and means for adjusting the relative amplitudes of said voltages so that voltages of different amplitude can be fed to said inductances, the arrangement being such that when said adjustable impedance is adjusted so as to cause said fluxes to cancel each other, or to cause the voltage across part or the whole of one or both of said inductances to have a minmium value, said unknown impedance is a calculable fraction or multiple of the impedances to which said adjustable impedance is adjusted, said fraction or multiple being determined by the ratio of the amplitudes of said alternating voltages and the turns ratio of said inductances. Said means for adjusting the relative amplitudes of said voltages may conveniently comprise a second pair of tightly coupled inductances, each of said inductances feeding a different one of said impedances, whereby the ratio of the amplitudes of said voltages is determined by the turns ratio of said second pair of inductances. If desired, said second pair of inductances may be an autotransformer, and a further adjustable impedance may be coupled to one of said inductances so as to balance a part, which may be the minimum value, of said adjustable impedance.

Preferably, said bridge arrangement is enclosed within a screening box, said screening box being effectively connected to adjacent ends of or the common point of said first mentioned inductances, and said bridge being so coupled to said indicating device, and if desired, to the generator of said voltages, that electrostatic coupling between said indicating device and said bridge and/or between said generator and said bridge, are substantially eliminated. If desired, said screening box may be enclosed within a further screening box arranged to be earthed in operation, whereby undesirable flow of current due to voltage variations of said screening box with respect to earth is reduced or eliminated.

According to a further feature of the invention, there is provided a method of measuring the impedance between two points independently of impedances between the said points and a third point which comprises connecting the screening box of a bridge arrangement according to the above mentioned features to said third point and measuring the impedance between said point by adjusting said adjustable impedance or impedances.

In order that the invention may be more fully understood, it will now be described by way of example with reference to the accompanying drawings, in which, Figure 1 shows the schematic arrangement of a known kind of bridge comprising closely coupled inductive ratio arms;

Figure 1:
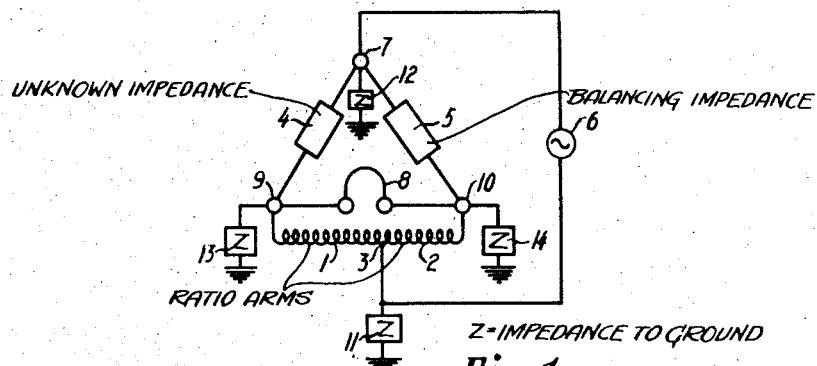

Referring to Figure 1, a bridge arrangement which has been previously proposed comprises the closely coupled inductances 1, 2 which are connected together at the point 3 and form two inductive ratio arms. The unknown impedance 4 and the balancing impedance 5 are connected in series across said ratio arms. The source of alternating current 6 is connected between the point 3 and the common point 7 of the impedances 4 and 5, and the telephones 8 are connected across the outer ends 9, 10 respectively of the inductances 1, 2. The impedances 11, 12, 13, 14 are the impedances to earth from the points 3, 7, 9, 10 respectively. If the inductances 1, 2 are of low resistance and are very tightly coupled in opposition, then when the voltage between the points 9, 10 is zero, that is when the bridge is in balance, the voltage induced in inductance 2 by the current flowing through inductance 1 will be equal and opposite to the voltage drop across inductance 2 due to the current flowing therethrough, so that the voltage at the point 10 will be substantially the same as the voltage at the point 3. Similarly, the voltage at the point 9 will be substantially the same as the voltage at the point 3. Thus, the inductive ratio arms are effectively very low impedance ratio arms, but at the same time do not shunt the telephones 8 with a low impedance, since for currents flowing directly between points 9 and 10, inductances 1 and 2 in series represent a very high impedance.

If the point 3 is earthed, the balance of the bridge is substantially independent of the impedances to earth 11, 12, 13, 14. Impedance 11 is short circuited, impedance 12 is only in shunt with the generator 6 and impedances 13 and 14 are so connected that substantially no voltage is set up across either of them when the bridge is balanced so that they do not take any current. This bridge arrangement thus makes it possible to measure an impedance between two points independently of the impedance between said points and earth.

It will be appreciated that the maximum ratio of the ratio arms is limited by practical considerations arising from the closeness of coupling between the inductances 1, 2 which may be attained in practice, and the ratio of impedances 4 and 5 cannot therefore be allowed to exceed a given value, which is in some cases 1000, if serious errors, due to leakage reactance and coil resistance are to be avoided.

Figure 2:
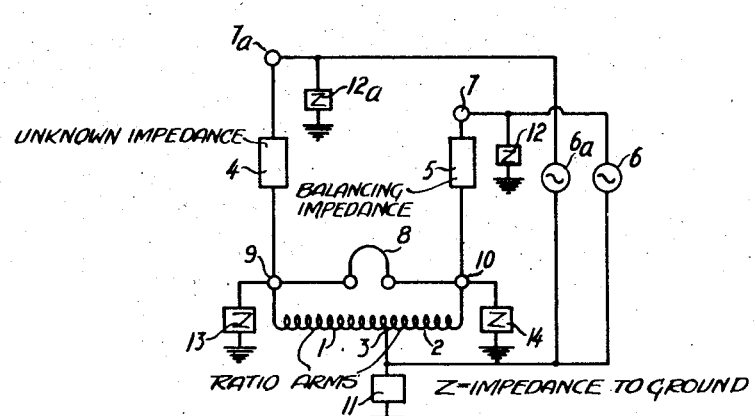
Figure 2 shows the schematic arrangement of a bridge according to the present invention.

According to the invention, however, this limitation is overcome by applying different voltages to the two inductive ratio arms. Referring now to Figure 2, in which similar elements are given the same reference numerals as in Figure 1, it will be seen that the impedance 4 has been disconnected from the point 7 and connected to one terminal 7a of another source of alternating current 6a, the other terminal of which is connected to the point 3. The two sources 6, 6a, provide current in the same phase and at the same frequency, but their respective voltages have different amplitudes. The voltage provided by the source 6a may therefore be regarded as a multiple or a fraction of the voltage provided by the source 6. It will be appreciated that the introduction of the second source 6a enables the bridge to be balanced with a great variety of ratios between the impedances 4 and 5. In effect, a second ratio arm has been introduced, and it can be shown that when the balance condition is set up, the ratio of the impedances 4 and 5 is equal to the product of $m$ and $n$, where $m$ is the ratio between the voltages of the sources 6a and 6 respectively and $n$ is the ratio of turns of the inductances 1, 2 respectively.

It will be appreciated that, since the balance condition brings the points 9 and 10 to substantially the same potential as the point 3, impedances effectively in shunt with the inductances 1 and 2 will again not have an appreciable effect upon the balance. Further, if the point 3 is earthed, the impedances to earth 12 and 12a from the points 7, 7a respectively will only be in shunt with the sources 6 and 6a and will not affect the bridge balance. Thus, this arrangement enables a wide range of impedances to be measured in terms of a known impedance, independently of the impedances to earth from either end of the impedance being measured.

Figure 3:
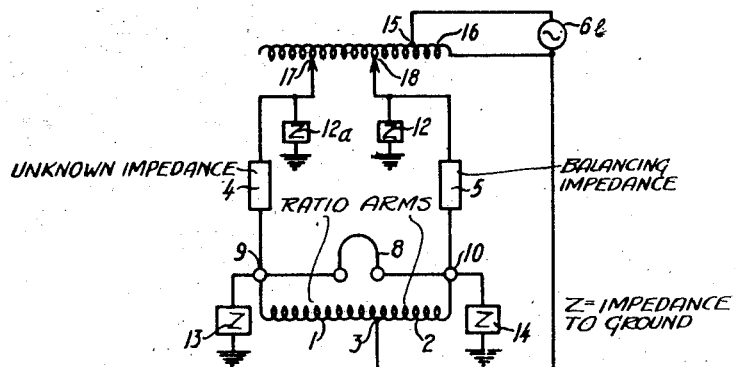
Figure 3 shows another schematic arrangement of a bridge according to the invention which incorporates two pairs of closely coupled inductances.

The two sources 6, 6a may be replaced by a single source by providing two further close coupled inductances. Referring to Figure 3, in which similar elements are given the same reference numerals as in Figure 2, it will be seen that the generator 6 is connected between the tapping point on the inductance 16 and the end of the inductance 2 which is connected to the point 3, and the impedances 4 and 5 are connected to tapping points 17 and 18 respectively on the inductance 16. Thus, the voltages applied to the impedances 4 and 5 may be varied by choice of the tapping point on said inductance 16, the ratio of the voltages being given by the ratio of turns included between each tapping point and the end of the inductance 16 connected to the point 3.

The arrangement shown in Figure 3 has the advantages referred to above, namely, that the bridge balance is substantially unaffected by the impedances 13, 14, 11, 12, 12a, providing that the coupling between the turns of the inductances 16 is very close, so that the impedances 12 and 12a do not modify the voltage ratios between the tapping points 17 and 18.

If the impedance 4 is not large in relation to the impedance 12a it is preferred to connect the source 6e to the tapping point 17 so as to place the impedance 12a directly in shunt with the source 6e and prevent it from affecting the bridge balance. The error arising from leakage reactance is then only associated with impedance 12, and as the impedance 5 can usually be large in comparison with the impedance 12, the error thus introduced will be small.

It is also preferably, if the impedance 4 is not large in relation to the impedance 13, to connect the telephones 8 between the points 9 and 3 so as to ensure that the bridge will be balanced so that no voltage difference exists between these points. The effect of leakage reactance and resistance in the inductances 1 and 2 will then be to cause a slight voltage difference between points 3 and 10, but this will not introduce serious error providing that, as can usually be arranged, the impedance 14 is large compared with the impedance 5.

It will be appreciated that it is not necessary for the inductances 1 and 2 to be connected together if separate sources of voltage are provided for the two arms of the bridge. Further, the telephones 8, or their equivalent, need not be connected to the inductances 1 or 2, but may be coupled thereto by means of a coupling winding or the like. The source 6e may also be coupled to the inductance 16 by means of an additional coupling winding, if desired.

If the known reactance which is used to balance the bridge has a minimum value which is inconveniently high, this minimum may be reduced or eliminated by connecting another balancing reactance on the opposite side of the bridge so as to balance out the undesired portion of said reactance.

If the reactance being measured has an appreciable resistance component, this may be balanced by means of one of the well known resistance balancing arrangements, for example, by connecting an adjustable resistance in shunt with the balancing reactance.

It has been explained that the bridge arrangements according to the invention enable the impedance between two points to be measured independently of the impedances of each of said points to earth. If the apparatus is enclosed within a screen so as to be completely screened from earth, the screen becomes the effective earth for the apparatus and by connecting the bridge screen to the junction of the inductive ratio arms the measurement is rendered independent of the impedances between said points and said screen. Thus, an impedance, the ends of which have impedance to a common conductor, may be measured in situ by connecting the screen enclosing the bridge apparatus to said common conductor. For example, a decoupling reactance having a bypass capacity connected from each of its ends to a common conductor may be measured without disconnection from said bypass capacities by connecting the bridge screen to said common conductor. When the bridge is used in this manner, certain precautions are desirable. The telephone, or the amplifier feeding the telephones if an amplifier is used, should be coupled to the inductive ratio arms by transformers and a low impedance balanced line. The transformer connected to the inductive ratio arms should have a screen between its windings, said screen being earthed to the bridge screen, and the low impedance line should be enclosed within a screen also connected to the bridge screen. The source of alternating current for the bridge is also coupled to the bridge in a similar manner. The leads which are attached to the impedance to be measured are screened, and the screening is connected to the bridge screen.

Figure 4:
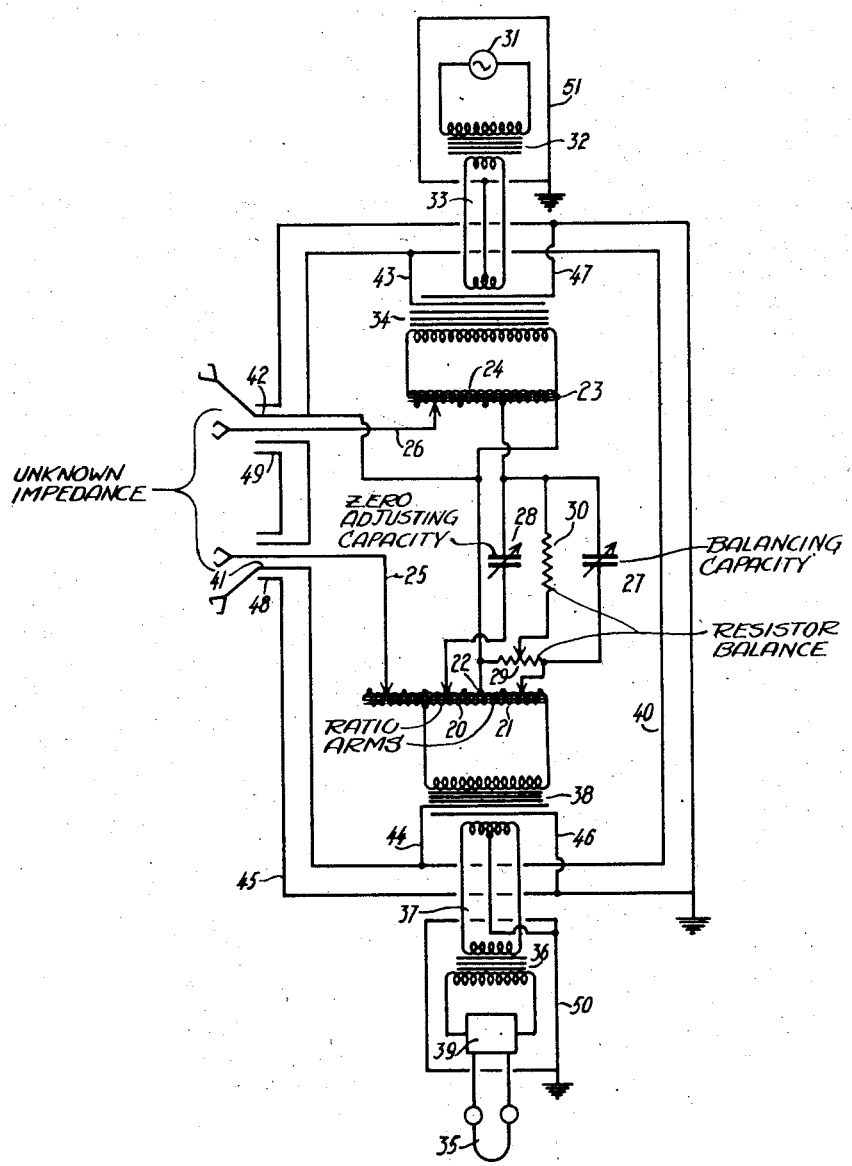
Figure 4 shows a practical arrangement of a bridge according to the invention.

A practical arrangement of the kind referred to will now be described with reference to Figure 4. The closely coupled inductances 20, 21 forming the ratio arms of the bridge are wound in bifilar fashion upon a high permeability core so as to reduce leakage inductance to a minimum. The inductances are wound with low resistance wire or strip so as to keep the resistance low and are provided with a number of tapping points so as to give a choice of ratios. The common point 22 of these inductances is connected to the right hand end 23 of the inductance 24, which provides the measuring voltage to the two arms of the bridge. The inductance 24 is also wound upon a core of high permeability and is of low resistance so as to reduce the undesirable result of leakage reactance and series resistance which have previously been referred to. Tappings are provided on the inductance 24 to permit adjustment of the ratio of the voltages applied to the two arms of the bridge. Two leads 25, 26, preferably provided with clips for effecting contact with the impedance to be measured, are connected to tappings on the inductances 20 and 24 respectively. The balancing capacity 27 and the zero adjusting capacity 28 are both connected to the same tapping on the inductance 24, and are also connected to tappings on the inductances 21 and 20 respectively. A potentiometer 29 is connected between the common point 22 of the inductances 20 and 21 and the tapping point on the inductance 21 to which the balancing capacity 27 is connected. The slider of the potentiometer 29 is connected through the resistance 30, which has a high resistance relative to the resistance of the potentiometer 29, to the tapping on the inductance 24 to which capacities 27 and 28 are connected. Potentiometer 29 in conjunction with resistance 30 provides a resistance balance. The measuring voltage is provided by the oscillator 31, which is preferably arranged to have a low impedane output, as for example, by means of a thermionic valve output stage provided with negative feedback in known manner, so that the sensitivity of the bridge is substantially independent of the value of the impedance being measured. Said oscillator may have a frequency of 1600 cycles/sec., and is coupled to the inductance 24 by means of the step down transformer 32, the balanced low impedance line 33 and the step up transformer 34, the secondary winding of which is connected to the outer ends of inductance 24.

The telephones 35 are coupled to the inductances 20, 21 by means of the step down transformer 36, the balanced low impedance line 37 and the step up transformer 38, the secondary of which is connected to tappings on the inductances 20 and 21. An amplifier 39 may be included between the transformer 36 and the telephones 35, and is preferably provided with a negative feedback circuit so arranged that in operation it presents a low impedance to the inductances 20, 21 without substantially reducing the signal/noise ratio at the input of said amplifier.

The bridge apparatus is enclosed in a screening box 40, and screens 41, 42 surrounding the measuring leads 25, 26 respectively are connected to said screening box and may be provided with contact clips for effecting contact to a conductor to which the impedance to be measured has capacity or the like which it is desired shall not affect the measurement. Transformers 34 and 38 are also provided with electrostatic screens 43, 44 respectively which are connected to the screening box 40.

As in operation the screening box 40 may not be at earth potential, it is enclosed within a further screening box 45 which is earthed in operation. To prevent the bridge balance from being affected by the flow of current through the capacity between the screening box 40 and the telephone output line, the transformer 38 is preferably provided with a second electrostatic screen 46 connected to the screening box 45. A similar additional screen 47 is also preferably provided for the oscillator input transformer 34, and additional screen 48, 49 respectively may with advantage be provided for the leads 25, 26, said additional screens being connected to the screening box 45. The transformer 36 and amplifier 39 are preferably enclosed in an earthed screening box 50 and the line 37 is preferably provided with a centre point earth, as for example, by connecting a centre tap on the low impedance winding of the transformer 38 to said screening box 50. Similarly, the transformer 32 and oscillator 31 are preferably enclosed in an earthed box 51, to which a centre tap on the low impedance winding of the transformer 34 is connected.

The arrangement described operates in the same manner as that described with reference to Figure 3. If high impedances are to be measured, the measuring leads 25, 26 are connected to tappings towards the left hand ends of inductances 20 and 24 respectively, and the balancing capacities 27, 28 are connected to one of the lower tappings nearer to the end 23 of the inductance 24. For the measurement of low impedances, the position is reversed. In this way, impedances ranging from 1/1000 to 1000 times the balancing impedance may be measured. The balancing capacity 27 may conveniently have a value of 500 micromicrofarads, and the zero adjusting capacity a value of 50 micromicrofarads. The tappings to which these capacities are connected may be arranged so that the capacity 27 is neutralised at some predetermined setting greater than its minimum, thus permitting the measurement of small negative capacities or inductances.

It will be appreciated that inductances may be measured by the provision of a variable inductance instead of the variable capacity. As, however, infinitely variable inductances are not always convenient to construct, the balance may be effected by connecting a tapped inductance to a potentiometer in a manner similar to the arrangement adopted for the resistance balance in Figure 4.

It will be appreciated that, as is generally the case with four terminal bridge networks, the source of voltage and the telephones or the like may be interchanged if desired.

What is claimed is:

1. An impedance bridge network for measuring an unknown impedance in terms of a known adjustable impedance, comprising said known and unknown impedances, two inductances of predetermined turns-ratio closely coupled together in magnetic opposition, first alternating voltage connecting means, means for supplying a first voltage from said connecting means to said unknown impedance and one of said inductances in series, second alternating voltage connecting means, means for supplying a second voltage from said second connecting means to said known adjustable impedance and the other of said coupled inductances in series, means for adjusting said adjustable impedance to provide a predetermined degree of magnetic flux cancellation in response to said supplied potentials across said coupled inductances, and means for indicating the value of said unknown impedance in terms of said adjustment of said adjustable known impedance, the ratio of the voltage amplitudes of said supplied voltages and the turns-ratio of said coupled inductances.

2. An impedance bridge network for measuring an unknown impedance in terms of a known adjustable impedance, comprising said known and unknown impedances, two inductances of predetermined turns-ratio closely coupled together in magnetic opposition, first alternating voltage connecting means, means for supplying a first voltage from said connecting means to said unknown impedance and one of said inductances in series, second alternating voltage connecting means, means for supplying a second voltage from said second connecting means to said known adjustable impedance and the other of said coupled inductances in series, means for adjusting the relative amplitudes of said supplied voltages, means for adjusting said adjustable impedance to provide a predetermined degree of magnetic flux cancellation in response to said supplied potentials across said coupled inductances, and means for indicating the value of said unknown impedance in terms of said adjustment of said adjustable known impedance, the ratio of the voltage amplitudes of said supplied voltages and the turns-ratio of said coupled inductances.

3. An impedance bridge network according to claim 1 including connections for a source of alternating current, an adjustable transformer energizable from said source connections, and means coupling said transformer to said first and second voltage connecting means for supplying predetermined first and second voltages to said impedances.

4. A network according to claim 3 wherein said transformer is an auto-transformer.

5. A bridge network according to claim 1 including a second adjustable impedance coupled to one of said inductances for balancing the impedance of a portion thereof.

6. A bridge network according to claim 1 including means for balancing the resistive component of said unknown impedance.

7. A bridge network according to claim 1 wherein said indicating means includes an indicator coupled to said inductances and responsive to the resultant energy induced therein by said opposing magnetic energy coupling.

8. A bridge network according to claim 7 including shielding means for electrostatically isolating said unknown impedance and said indicating means from the remainder of said network.

9. A bridge network according to claim 7 wherein said indicating means includes a negative-feedback amplifier presenting a low impedance shunting said inductances.

10. A bridge network according to claim 7 including voltage source connections, and low impedance coupling means connected between said source connections and said voltage connecting means to reduce variations in the sensitivity of said bridge with variations in value of said unknown impedance.

DOREEN WALKER,
*Executrix of Alan Dower Blumlein, Deceased.*

REFERENCES CITED

The following references are of record in the file of this patent:

UNITED STATES PATENTS

| Number    | Name    | Date          |
|-----------|---------|---------------|
| 1,501,576 | Whiting | July 15, 1924 |
| 1,573,337 | Vennes  | Feb. 16, 1926 |

OTHER REFERENCES

Hague: A. C. Bridge Methods, 4th ed., Pitman Publishing Co., N. Y., 1938, pages 297–299.